US010295977B2

(12) United States Patent
Amirthasamy et al.

(10) Patent No.: US 10,295,977 B2
(45) Date of Patent: May 21, 2019

(54) SMART AUTO RESET FOR DIGITAL POSITIONERS CONNECTED TO A LOCAL CONTROL PANEL OR PUSH BUTTON

(71) Applicant: FISHER CONTROLS INTERNATIONAL LLC, Marshalltown, IA (US)

(72) Inventors: Stanley Felix Amirthasamy, Ames, IA (US); Jimmie L. Snowbarger, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 399 days.

(21) Appl. No.: 15/005,087

(22) Filed: Jan. 25, 2016

(65) Prior Publication Data
US 2017/0212486 A1    Jul. 27, 2017

(51) Int. Cl.
G05B 19/042    (2006.01)

(52) U.S. Cl.
CPC ....... *G05B 19/042* (2013.01); *G05B 19/0428* (2013.01); *G05B 2219/24112* (2013.01); *G05B 2219/24202* (2013.01); *G05B 2219/24212* (2013.01)

(58) Field of Classification Search
CPC ........ G05B 19/042; G05B 2219/24112; G05B 19/05; G05B 19/4067
See application file for complete search history.

(56) References Cited

U.S. PATENT DOCUMENTS

| 2,582,027 | A |   | 1/1952  | Goff, Jr. |             |
|-----------|---|---|---------|-----------|-------------|
| 3,928,833 | A |   | 12/1975 | McClellan |             |
| 4,175,283 | A | * | 11/1979 | Buchwald  | G05D 23/1906 |
|           |   |   |         |           | 318/610     |
| 4,338,115 | A |   | 7/1982  | Farkas    |             |

(Continued)

FOREIGN PATENT DOCUMENTS

EP    1487003 A1    12/2004

OTHER PUBLICATIONS

International Search Report for PCT Application No. PCT/US2017/014801 dated Apr. 19, 2017.

(Continued)

*Primary Examiner* — Khamdan N. Alrobaie
(74) *Attorney, Agent, or Firm* — Marshall, Gerstein & Borun LLP

(57) ABSTRACT

A process control device may include a controller having a remote device trip initiation input, a local device trip initiation input, a remote trip condition input, and a local device reset input. The process control device may also include a device trip source determination module configured to determine a device trip source based on at least one of: the remote device trip initiation input and the local device trip initiation input. The process control device may further include a device reset determination module configured to: automatically generate a device reset when the device trip source determination module determines that the device trip source is a remote device trip and based on the remote trip condition input; or generate the device reset when the device trip source determination module determines that the device trip source is a local device trip and based on the local device reset input.

20 Claims, 5 Drawing Sheets

(56) References Cited

U.S. PATENT DOCUMENTS

| | | | |
|---|---|---|---|
| 7,020,876 B1* | 3/2006 | Deitz | G05B 19/41865 |
| | | | 700/1 |
| 2004/0193290 A1* | 9/2004 | Ott | G05B 9/02 |
| | | | 700/18 |
| 2006/0146462 A1* | 7/2006 | McMillian, IV | G08C 17/02 |
| | | | 361/62 |
| 2006/0152867 A1* | 7/2006 | Bonasia | H02H 3/335 |
| | | | 361/42 |
| 2007/0135087 A1* | 6/2007 | Villevieille | H04M 1/6091 |
| | | | 455/403 |
| 2012/0139725 A1* | 6/2012 | Grumstrup | F16K 37/0091 |
| | | | 340/540 |

OTHER PUBLICATIONS

Written Opinion for PCT Patent Application No. PCT/US2017/014801 dated Apr. 19, 2017.

* cited by examiner

SMART AUTO RESET FOR DIGITAL POSITIONERS CONNECTED TO A LOCAL CONTROL PANEL OR PUSH BUTTON

FIELD OF THE INVENTION

The present disclosure relates to apparatuses, systems and methods for resetting digital process control devices. More specifically, the present disclosure relates to apparatuses, systems and methods for automatically resetting digital process control devices in particular circumstances.

BACKGROUND

Modern process plants (e.g., petroleum refining plants, food processing plants, chemical processing plants, etc.) include a vast array of process control devices (e.g., valves, valve actuators, pumps, agitators, motors, rotating equipment, turbines, sensors, etc.). During normal operation of the process plant, the process control devices operate in a normal mode. Other times (e.g., during abnormal process plant conditions), the process control devices may experience a trip condition.

Known process control devices, methods and systems do not allow a user to manually reset only a device that was tripped, using a pushbutton or local control panel, while allowing other devices to automatically reset. Furthermore, known process control devices, methods and systems to not allow a user to perform a timed synchronized plant start-up, while preserving an ability to manually reset the device that was tripped using a pushbutton or local control panel.

What is needed is apparatuses, methods, and systems that allow a user to manually reset only a device that was tripped, using a pushbutton or local control panel, while allowing other devices to automatically reset. Apparatuses, methods and systems are also needed that allow a user to perform a timed synchronized plant start-up, while preserving an ability to manually reset the device that was tripped using a pushbutton or local control panel.

SUMMARY

A process control device may include a controller having a remote device trip initiation input, a local device trip initiation input, a remote trip condition input, and a local device reset input. The process control device may also include a device trip source determination module configured to determine a device trip source based on at least one of: the remote device trip initiation input and the local device trip initiation input. The process control device may further include a device reset determination module configured to automatically generate a device reset when the device trip source determination module determines that the device trip source is a remote device trip and based on the remote trip condition input, or generate the device reset when the device trip source determination module determines that the device trip source is a local device trip and based on the local device reset input.

In another embodiment, a system for resetting a process control device may include a process control device and a controller having a remote device trip initiation input, a local device trip initiation input, a remote trip condition input, and a local device reset input. The controller may be configured to determine a device trip source based on at least one of: the remote device trip initiation input and the local device trip initiation input. The controller may be further configured to automatically generate a device reset when the device trip source determination module determines that the device trip source is a remote device trip and based on the remote trip condition input, or generate the device reset when the device trip source determination module determines that the device trip source is a local device trip and based on the local device reset input.

In a further embodiment, a computer implemented method may include receiving a remote device trip initiation input at a processor of a computing device in response to the processor executing a remote device trip initiation input receiving module. The method may also include receiving a local device trip initiation input at a processor of a computing device in response to the processor executing a local device trip initiation input receiving module. The method may further include receiving a remote trip condition input at a processor of a computing device in response to the processor executing a remote trip condition input receiving module. The method may yet also include receiving a local device reset input at a processor of a computing device in response to the processor executing a local device reset input receiving module. The method may yet further include determining, using a processor of a computing device, a device trip source based on at least one of: the remote device trip initiation input and the local device trip initiation input, in response to the processor executing a device trip source determination module. The method may also include automatically generating, using a processor of a computing device, a device reset when the device trip source is determined to be a remote device trip and based on the remote trip condition input, in response to the processor executing a device reset determination module. The method may further include generating, using a processor of a computing device, the device reset when the device trip source is determined to be a local device trip and based on the local device reset input, in response to the processor executing the device reset determination module.

In further accordance with any one or more of the foregoing first, second, or third aspects, a process control reset device and/or method may further include any one or more of the following preferred forms.

In one preferred form, a process control reset device and/or method may include a controller having a system start up sequence input, and a timed synchronized startup that is performed based on a device reset and a system start up sequence input.

In another preferred form, a process control reset device and/or method may include a controller having a source of trip indication output, and the controller may generate an indication of a source of a device trip initiator based on at least one of: a remote device trip initiation input and a local device trip initiation input.

In yet a further preferred form, a process control reset device and/or method may include a controller that is configured to record when a reset is performed.

In yet a further preferred form, a process control device reset device and/or method may include a controller that is selected from a group of: a local control panel, a logic solver, and a digital valve controller, and a device trip source determination module and a device reset determination module may be incorporated into the controller.

In another preferred form, a process control reset device and/or method may include a local control panel that receives a local device trip initiation input and a local device reset input from a local push button panel.

DETAILED DESCRIPTION

A digital valve controller may be configured to latch in place after a trip. Once a user verifies that all is well in a vicinity of an associated valve, the user may reset the valve, to a normal position, from the trip position. Alternatively, the digital valve controller may be configured to automatically reset, in which case the valve may return to the normal position once, for example, a loop current is restored. Additionally, the user may configure the digital valve controller to latch when a trip is initiated from a connected local control panel (e.g., a trip is initiated via a push button). Thereby, the apparatuses, systems and methods of the present disclosure may save a user time by allowing an auto reset behavior, while preserving an ability to hold a valve latched when a trip is initiated from a connected local control panel or push button. Accordingly, the user may verify that a hazard, that caused the trip, is no longer present. Once the user determines that the hazard no longer exists, the user may reset the valve.

The apparatuses, systems and methods of the present disclosure may also allow a user to perform timed synchronized startups by allowing the user to reset the valve after verifying that the hazard is no longer present followed by a system start up sequence. For example, a local trip may be initiated in response to a field operator observation of an associated hazard. Subsequently, the field operator may grant local reset permission after confirming the hazard is no longer present, thereby, may allow a timed synchronized start up. Alternatively, the logic solver 220 may provide a remote reset and a synchronized startup may be performed in co-ordination between the logic solver 220 and an associated distributed control system.

Generally, a digital valve controller may be aware of a source of a trip initiator, and may modify a latch behavior based on the source of the trip initiator. Furthermore, the digital valve controller may provide an indication of a source of a trip initiator. Thereby, a user may discern if a manual or system reset occurred based on the indication provided. The digital valve controller may also record when a reset is performed.

Logic for the manual reset and the automatic reset functions may be incorporated into a local control panel. Alternatively, or additionally, the logic for the manual reset and the automatic reset functions may be incorporated into a logic solver (e.g., logic solver 220 of FIG. 2) and/or a digital valve controller.

Figure 1:
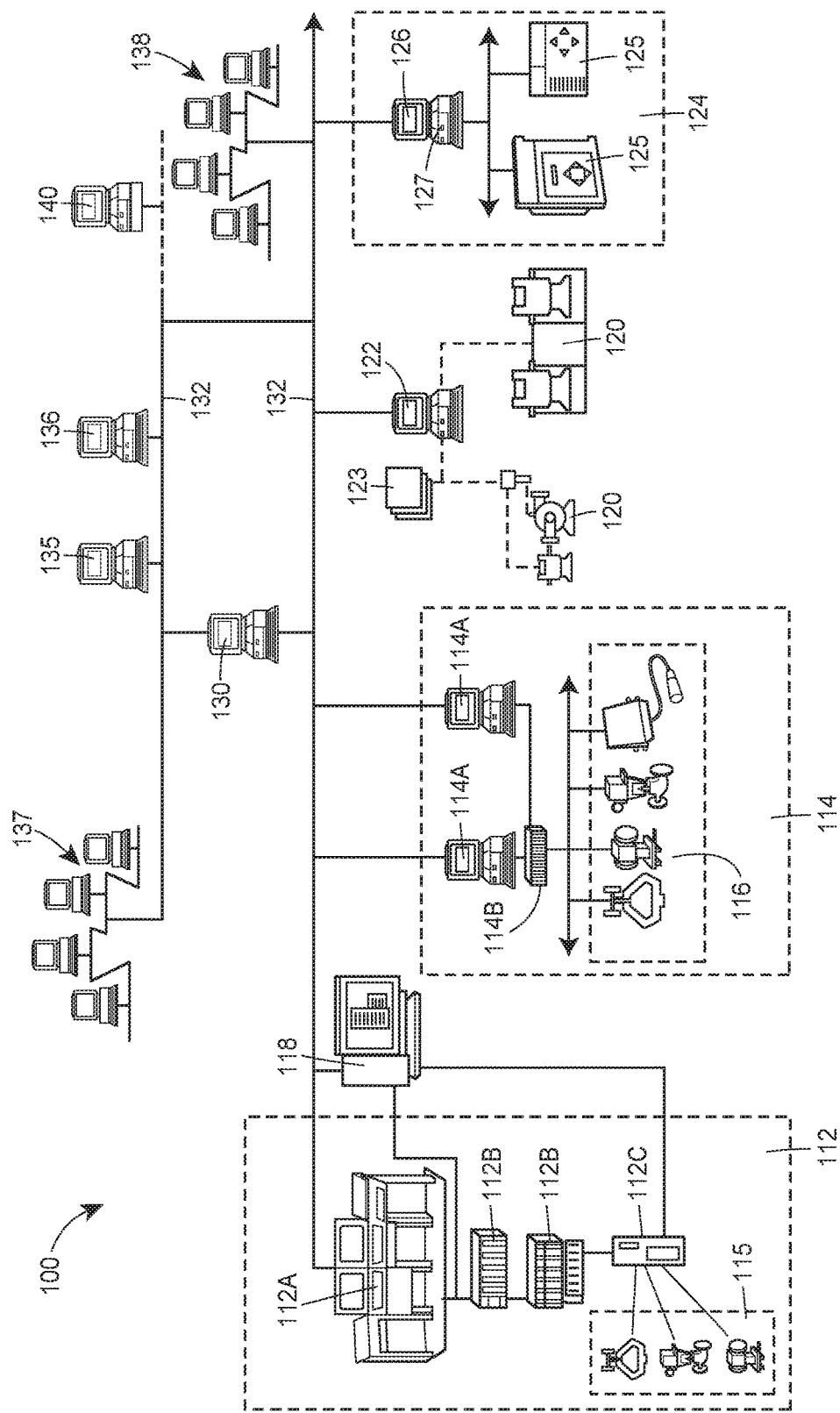
FIG. 1 depicts a block diagram of an example plant supervisory control and data acquisition system for automatically resetting process control devices in particular circumstances.

Turning to FIG. 1, a plant supervisory control and data acquisition (SCADA) system 100 may include a number of business and other computer systems interconnected with a number of control and/or monitoring devices by one or more communication networks. The plant SCADA system 100 may include a plethora of modules being executed by an equally staggering number of process control devices 115, 116, 120 located throughout the plant.

The plant SCADA system 100 may include one or more process control systems 112 and 114. The process control system 112 may be, for example, a traditional process control system such as a PROVOX or RS3 system or any other distributed control system (DCS), which may include an operator interface 112A coupled to a controller 112B and to input/output (I/O) cards 112C which, in turn, may be coupled to various field devices such as analog and Highway Addressable Remote Transmitter (HART) field devices 115. The process control system 114, which may be a distributed process control system, may include one or more operator interfaces 114A coupled to one or more distributed controllers 114B via a bus, such as an Ethernet bus. The controllers 114B may be, for example, DeltaV™ controllers sold by Fisher-Rosemount Systems, Inc. of Austin, Tex. or any other desired type of controllers. The controllers 114B may be connected via I/O devices to one or more field devices 116, such as for example, HART or Foundation Fieldbus (FF) devices, or any other smart or non-smart field devices including, for example, those that use any of the PROFIBUS®, WORLDFIP®, Device-Net®, AS-Interface and CAN protocols.

The field devices 116 may provide analog or digital information to the controllers 114B related to process variables as well as to other device information. The operator interfaces 114A may store and execute modules available to the process control operator for controlling operation of a process plant including, for example, control optimizers, diagnostic experts, neural networks, tuners, etc. Any given device, within a process control system 112, 114, may include a number of modules stored on a corresponding memory and at least periodically executed by a corresponding processor. Any of the field devices 116 may allow a user to manually reset only a particular one of the field devices 116 that was tripped, using a pushbutton or local control panel, while allowing other field devices 116 to automatically reset. Furthermore, the field devices 116 may allow a user to perform a timed synchronized plant start-up, while preserving an ability to manually reset the field device 116 that was tripped using a pushbutton or local control panel.

Maintenance systems, such as a computer 118 executing an asset management solutions (AMS) module or any other device monitoring and communication module may be connected to the process control systems 112 and 114 or to the individual field devices therein to perform maintenance and monitoring activities. For example, a maintenance computer 118 may be connected to the controller 112B and/or to the field devices 115 via any desired communication lines or networks (including wireless or handheld device networks) to communicate with and, in some instances, reconfigure or perform other maintenance activities on the field devices 115. Similarly, maintenance modules such as an AMS module may be installed in and executed by one or more of the user interfaces 114A associated with the distributed process control system 114 to perform maintenance and monitoring functions, including data collection related to the operating status of the field devices 116.

The plant SCADA system 100 may also include various rotating equipment 120, such as turbines, motors, etc. which may be connected to a maintenance computer 122 via some permanent or temporary communication link (such as a bus, a wireless communication system or hand held devices which may be connected to the equipment 120 to take readings and are then removed). The maintenance computer 122 may store and execute known monitoring and diagnostic modules 123, for example RBMware™ sold by CSI Systems of Knoxville, Tenn. or any other known modules used to diagnose, monitor and optimize an operating state of the rotating equipment 120. Maintenance personnel usually use the modules 123 to maintain and oversee performance of rotating equipment 120, to determine problems with the rotating equipment 120 and to determine when and if the rotating equipment 120 needs to be repaired or replaced. Any of the rotating equipment 120 may allow a user to manually reset only a particular one of the rotating equipment 120 that was tripped, using a pushbutton or local control panel, while allowing other rotating equipment 120 to automatically reset. Furthermore, the rotating equipment 120 may allow a user to perform a timed synchronized plant start-up, while preserving an ability to manually reset the rotating equipment 120 that was tripped using a pushbutton or local control panel.

The plant SCADA system 100 may include a logic solver 220 that implements safety applications in addition to control applications. For example, the logic solver 220 may implement a safety instrumented system (SIS) to safeguard the process control system to prevent a dangerous event, such as a release of toxic, flammable, or explosive chemicals. The SIS may be a distinct, reliable system used to complement the process control system and take action to bring the process control system to a safe state when necessary. The SIS may utilize sensors, logic solvers 220, and actuators to implement a safety instrumented function (SIF) to reach or maintain a safe state.

Plant SCADA system 100 may also include a power generation and distribution system 124 having power generating and distribution equipment 125 associated with the plant connected via, for example, a bus, to another computer 126 which may run and oversee operation of the power generating and distribution equipment 125. The computer 126 may execute known power control and diagnostics modules 127 such as those provided by, for example, Liebert and ASCO or other companies to control and maintain the power generation and distribution equipment 125. A plurality of modules may be stored and executed on the power generation and distribution equipment. Any of the power generation and distribution equipment 125 may allow a user to manually reset only a particular one of the power generating and distribution equipment 125 that was tripped, using a pushbutton or local control panel, while allowing other power generating and distribution equipment 125 to automatically reset. Furthermore, the power generating and distribution equipment 125 may allow a user to perform a timed synchronized plant start-up, while preserving an ability to manually reset the power generating and distribution equipment 125 that was tripped using a pushbutton or local control panel.

A computer system 130 may be provided which may be communicatively connected to the computers or interfaces associated with the various functional systems within the process plant 100, including the process control functions 112 and 114, the maintenance functions such as those implemented in the computers 118, 114A, 122 and 126 and the business functions. In particular, the computer system 130 may be communicatively connected to the traditional process control system 112 and to the maintenance interface 118 associated with that control system, may be connected to the process control and/or maintenance interfaces 114A of the distributed process control system 114, may be connected to the rotating equipment maintenance computer 122 and to the power generation and distribution computer 126, all via a bus 132. The bus 132 may use any desired or appropriate local area network (LAN) or wide area network (WAN) protocol to provide communications. As illustrated in FIG. 1, the computer 130 is also connected via the same or a different network bus 132 to business system computers and maintenance planning computers 135 and 136, which may execute, for example, enterprise resource planning (ERP) module, material resource planning (MRP) module, computer maintenance management systems (CMMS), accounting, production and customer ordering systems module, maintenance planning systems module or any other desired business modules such as parts, supplies and raw materials ordering modules, production scheduling modules, etc. The computer 130 may also be connected via, for example, the bus 132, to a plantwide LAN 137, a corporate WAN 138, as well as, to a computer system 140 that enables remote monitoring of, or communication within the plant from remote locations.

Figure 2:
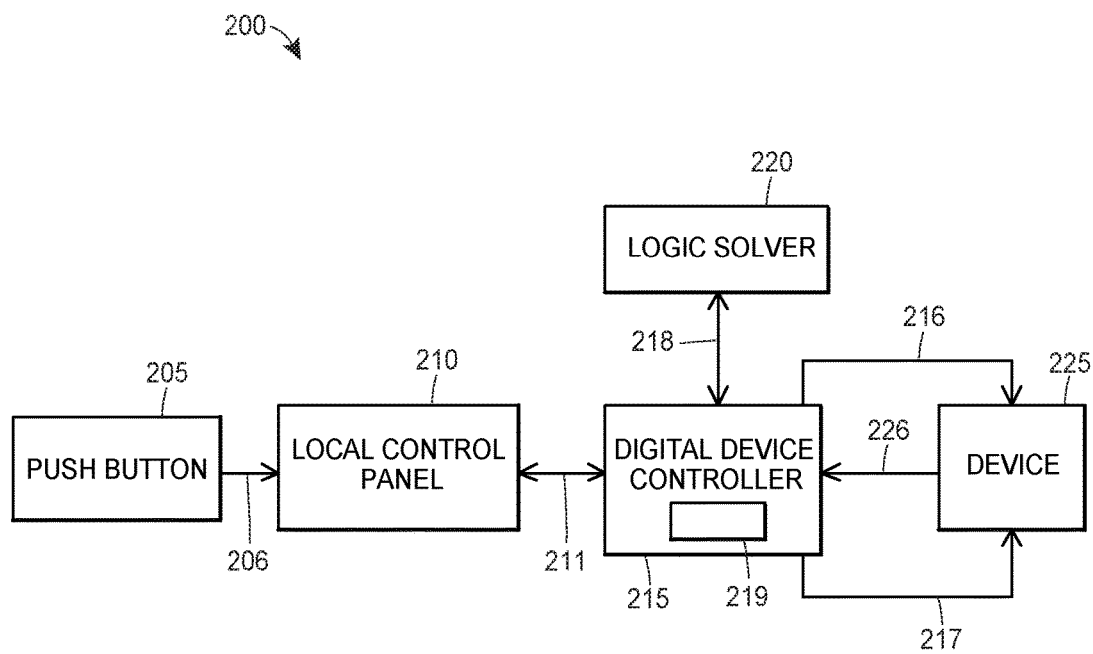
FIG. 2 depicts a block diagram of an example system for automatically resetting process control devices in particular circumstances.

With reference to FIG. 2, a system for automatically resetting process control devices in particular circumstances 200 may include a process control device 225 (e.g., valves, valve actuators, pumps, agitators, motors, rotating equipment, turbines, sensors, etc.) connected to a digital device controller 215 (e.g., a digital positioner). In particular, the digital device controller 215 may communicate a trip state initiation signal 216 and/or a normal state initiation signal 217 to the device 225. The device 225 may, in turn, communicate a device state signal 226 to the digital device controller 215. The trip state initiation signal 216, the normal state initiation signal 217 and/or the device state signal may be communicated via a hardwired interconnection (e.g., a 4-20 mA signal, an RS-232 signal, an RS-422 signal, etc.) or a wireless communication medium (e.g., IEEE 802._, WAN, LAN, Bluetooth, etc.). The digital device controller 215 (and/or the local control panel 210 and/or the logic solver 220) may include a processor 219.

The digital device controller 215 may further be connected to a local control panel 210, via a local interconnection 211, and/or a logic solver 220 via a logic interconnection 218. The local control panel 210 may be connected to a push button panel 205 via a push button interconnection 206. The local interconnection 211, the logic interconnection 218 and/or the push button interconnection 218 may include a hardwired interconnection (e.g., a 4-20 mA signal, an RS-232 signal, an RS-422 signal, etc.) or a wireless communication medium (e.g., IEEE 802._, WAN, LAN, Bluetooth, etc.).

In any event, the system 200 may allow a user to perform timed synchronized startups by allowing the user to reset the valve after verifying that the hazard is no longer present followed by a system start up sequence. For example a digital device controller 215 may be aware of a source of a trip initiator, and may modify a latch behavior based on the source of the trip initiator.

A digital device controller 215 may be configured to latch in place after a trip. Once a user verifies that all is well in a vicinity of an associated device 225, the user may reset the device 225, to a normal position, from the trip position. Alternatively, the digital device controller 215 may be configured to automatically reset, in which case the device 225 may return to the normal position once, for example, a loop current is restored. Additionally, the user may configure the digital device controller 215 to latch when a trip is initiated from a connected local control panel 210. Thereby, the system 200 may save a user time by allowing an auto reset behavior, while preserving an ability to hold a device latched when a trip is initiated from a connected local control panel 210 or push button panel 205. Accordingly, the user may verify that a hazard, that caused the trip, is no longer present. Once the user determines that the hazard no longer exists, the user may reset the device 225.

Furthermore, the digital device controller 215 may provide an indication of a source of a trip initiator. Thereby, a user may discern if a manual or system reset occurred based on the indication provided. The digital device controller 215 may also record when a reset is performed.

Logic for the manual reset and the automatic reset functions may be incorporated into a local control panel 210. Alternatively, or additionally, the logic for the manual reset and the automatic reset functions may be incorporated into a logic solver 220 and/or a digital device controller 215.

Figure 3:
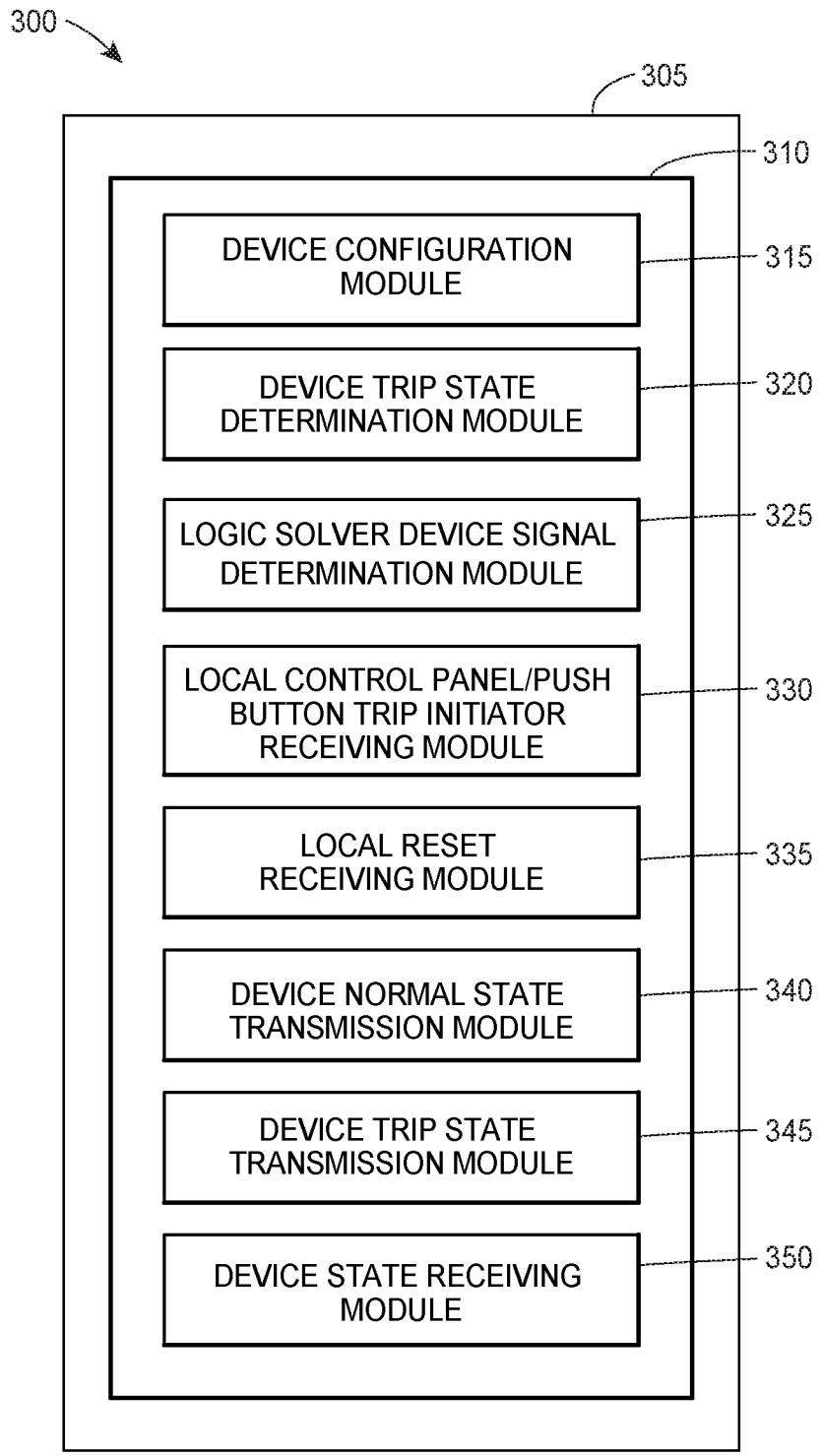
FIG. 3 depicts an example apparatus for automatically resetting process control devices in particular circumstances.

Turning to FIG. 3, an example apparatus 305 for automatically resetting process control devices in particular circumstances 300 may include a device configuration module 315, a device trip state determination module 320, a logic solver device signal determination module 325, a local control panel/push button trip initiator receiving module 330, a local reset receiving module 335, a device normal state transmission module 340, a device trip state transmission module 345, and/or a device state receiving module 350. The apparatus 305 may be similar to, for example, either the digital device controller 215, the local control panel 210, or the logic solver 220 of FIG. 2. Alternatively, the apparatus 305 may similar to a combination or sub-combination of the digital device controller 215, the local control panel 210, or the logic solver 220.

The device configuration module 315, the device trip state determination module 320, the logic solver device signal determination module 325, the local control panel/push button trip initiator receiving module 330, the local reset receiving module 335, the device normal state transmission module 340, the device trip state transmission module 345, and/or the device state receiving module 350 may be a hardware module (e.g., an electrical circuit made up of discrete components, a logic circuit, a field programmable gate array (FPGA), an application specific integrated circuit (ASIC), etc.) configured to automatically reset a process control device (e.g., process control device 225 of FIG. 2) in particular circumstances. Alternatively, the device configuration module 315, the device trip state determination module 320, the logic solver device signal determination module 325, the local control panel/push button trip initiator receiving module 330, the local reset receiving module 335, the device normal state transmission module 340, the device trip state transmission module 345, and/or the device state receiving module 350 may be stored on a computer-readable medium (e.g., a non-transitory computer-readable medium or a transitory computer-readable medium) as, for example, a set of computer-readable instructions that, when executed by a processor (e.g., processor 219 of FIG. 2) or a computing device, cause the processor 219 to automatically reset a process control device (e.g., process control device 225 of FIG. 2) in particular circumstances.

Figure 4:
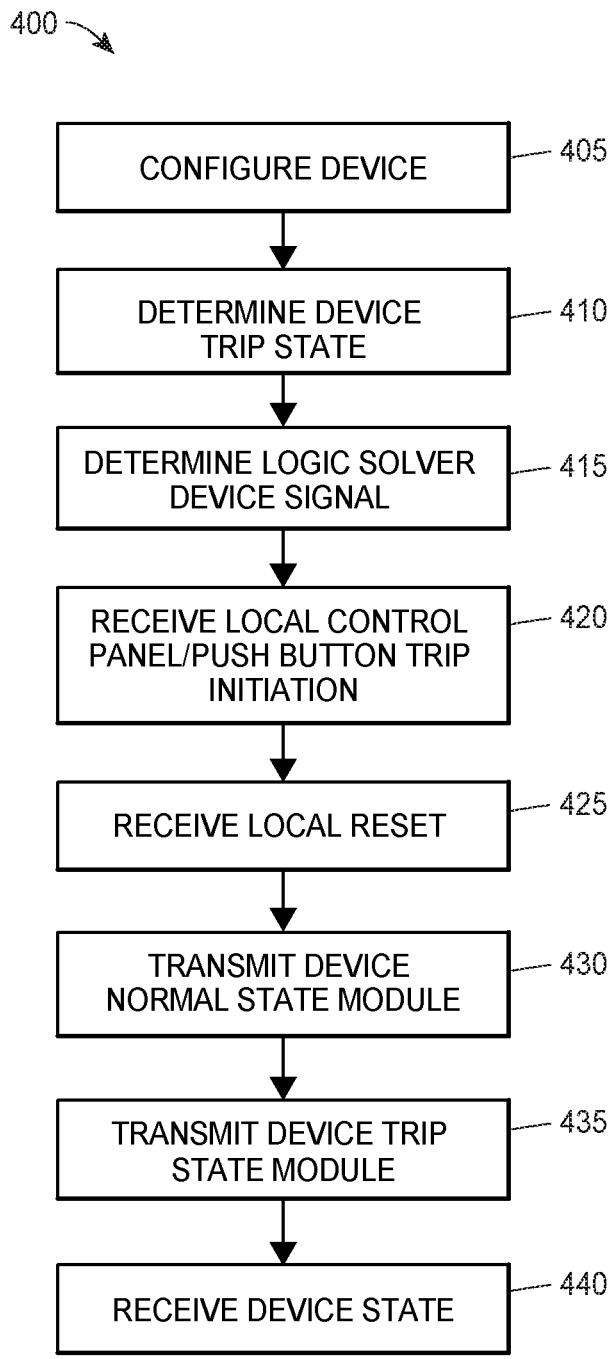
FIG. 4 depicts an example method for automatically resetting process control devices in particular circumstances.

With reference to FIG. 4, a method for automatically resetting process control devices in particular circumstances 400 may, for example, include a processor (e.g., processor 219 of FIG. 2) that executes a device configuration module 315 to cause the processor 219 to configure at least one process control device (block 405). A digital device controller 215 may be configured (block 405) to latch in place after a trip. Once a user verifies that all is well in a vicinity of an associated device 225, the user may reset the device 225, to a normal position, from the trip position. Alternatively, the digital device controller 215 may be configured (block 405) to automatically reset, in which case the device 225 may return to the normal position once, for example, a loop current is restored. Additionally, the user may configure the digital device controller 215 (block 405) to latch when a trip is initiated from a connected local control panel 210. Thereby, the method 400 may save a user time by allowing an auto reset behavior, while preserving an ability to hold a device latched when a trip is initiated from a connected local control panel 210 or push button panel 205. Accordingly, the user may verify that a hazard, that caused the trip, is no longer present. Once the user determines that the hazard no longer exists, the user may reset the device 225.

The processor 219 may also execute a device trip state determination module 320 to, for example, cause the processor 219 to determine a trip state of a process control device (block 410). The processor 219 may determine a trip state of a process control device based on, for example, a device trip state signal (e.g., device trip state signal 226 of FIG. 2).

The processor 219 may further execute a logic solver device signal determination module 325 to, for example, cause the processor 219 to determine a logic solver device signal (block 415). The processor 219 may determine a logic solver device signal (e.g., logic signal 218 of FIG. 2) based on, for example, a device trip state initiation signal (e.g., device trip state initiation signal 216 of FIG. 2), a device normal state initiation signal (e.g., device normal state initiation signal 217 of FIG. 2), a device state signal (e.g., device state signal 226 of FIG. 2), and/or a reset signal (e.g., push button signal 206 of FIG. 2 or a remote reset signal).

The processor 219 may yet also execute a local control panel/push button trip initiator receiving module 330 to, for example, cause the processor 219 to receive a device trip initiation (block 420). For example, the processor 219 may receive a trip initiation signal (e.g., device trip state initiation signal 216) from a push button panel (e.g., push button panel 205 of FIG. 2).

The processor 219 may yet further execute a local reset receiving module 335 to, for example, cause the processor 219 to receive a local reset signal (block 425). For example, the processor 219 may receive a local reset signal from a push button panel (e.g., push button panel 205 of FIG. 2).

The processor 219 may also execute a device normal state transmission module 340 to, for example, cause the processor 219 to transmit a device normal state signal (block 430). For example, the processor 219 may transmit a device normal state initiation signal (e.g., device normal state initiation signal 217 of FIG. 2) to a device (e.g., process control device 225 of FIG. 2).

The processor 219 may further execute a device trip state transmission module 345 to, for example, cause the processor 219 to transmit a device trip state signal (block 435). For example, the processor 219 may transmit a device trip state initiation signal (e.g., device trip state initiation signal 216 of FIG. 2) to the device 225.

The processor 219 may execute a device state receiving module 350 to, for example, cause the processor 219 to receive a device state signal (block 440). For example, the processor 219 may receive a device state signal (e.g., device state signal 226 of FIG. 2) for the device 225.

In any event, the method 400 may allow a user to perform timed synchronized startups by allowing the user to reset the valve after verifying that the hazard is no longer present followed by a system start up sequence. For example a digital device controller 215 may be aware of a source of a trip initiator, and may modify a latch behavior based on the source of the trip initiator. The method 400 may allow a user to manually reset only a device that was tripped, using a pushbutton or local control panel, while allowing other devices to automatically reset.

Figure 5:
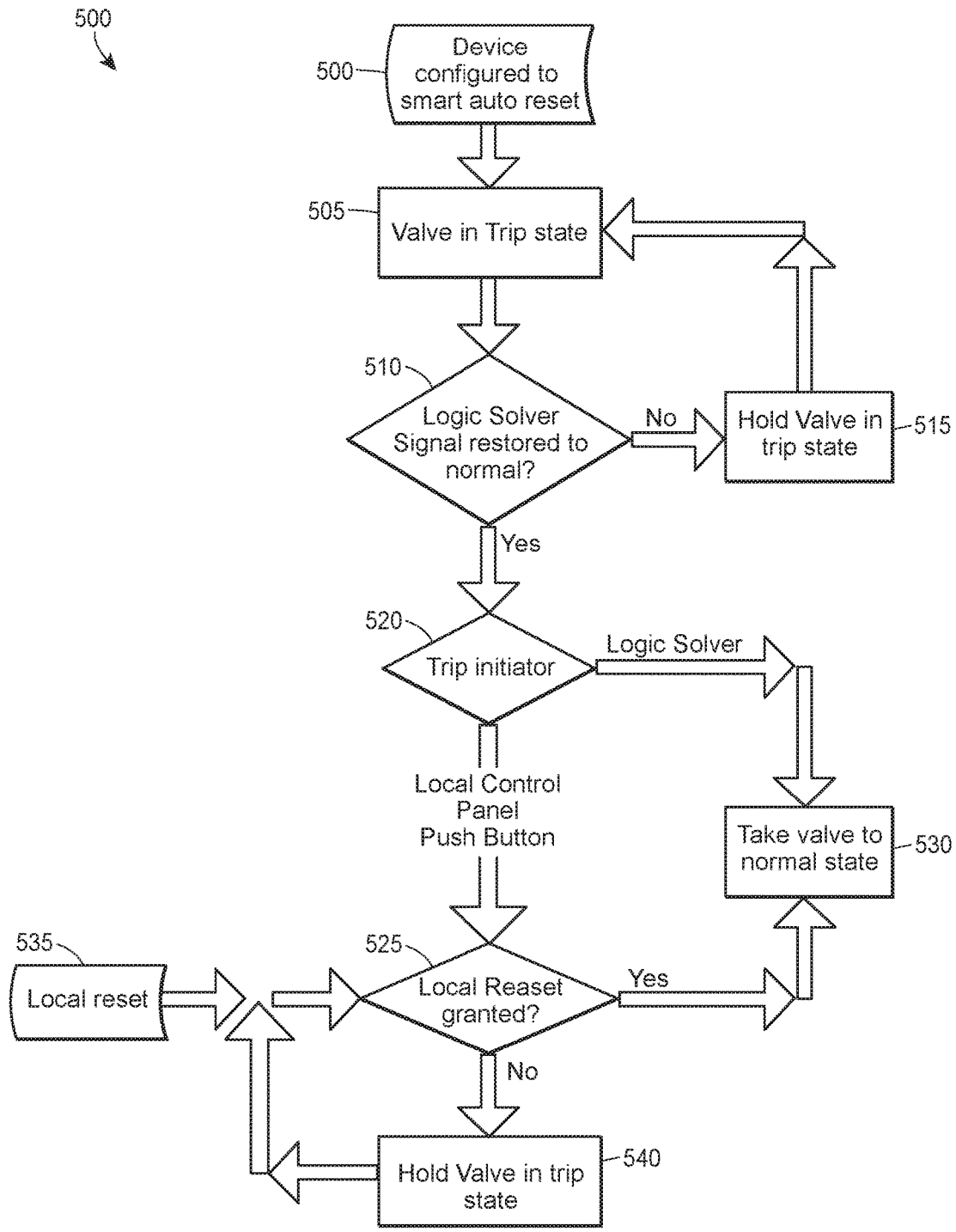
FIG. 5 depicts an example method for automatically resetting process control devices in particular circumstances.

Turning to FIG. 5, a method for automatically resetting process control devices in particular circumstances 500 may include a device 225 configured (block 500) to automatically reset in certain circumstances (e.g., when the device 225 is tripped remotely). When a valve is in a trip state (block 505) and a logic solver signal is not restored to normal (block 510), the valve is held in the trip state (block 515).

When a valve is in a trip state (block 505) and a logic solver signal is restored to normal (block 510), the source of the valve trip initiation is determined (block 520). When the source of the valve trip initiation is determined to be the logic solver (block 520), the valve is returned to a normal state automatically when, for example, an associated loop current returns to a normal level (block 530). When the source of the valve trip initiation is determined to be a local control panel/push button (block 520), a local reset (block 535) is determined to be granted (block 525), the valve is returned to a normal state (block 530).

When the source of the valve trip initiation is determined to be a local control panel/push button (block 520) and the local reset (block 535) is determined to not be granted (block 525), the valve is held in a trip state (block 540). In any event, the method 500 may allow a user to perform timed synchronized startups by allowing the user to reset the valve after verifying that the hazard is no longer present followed by a system start up sequence. For example a digital device controller 215 may be aware of a source of a trip initiator, and may modify a latch behavior based on the source of the trip initiator. The method 500 may allow a user to manually reset only a device that was tripped, using a pushbutton or local control panel, while allowing other devices to automatically reset.

Upon reading this disclosure, those of skill in the art will appreciate still additional alternative structural and functional designs for a program flow control monitoring routine. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the algorithm, method and apparatus disclosed herein without departing from the spirit and scope defined in the appended claims.

What is claimed is:

1. A process control device in a process plant, comprising:
a controller having a remote device trip initiation input, a local device trip initiation input, a remote trip condition input, and a local device reset input, wherein the local device trip initiation input and the local device reset input are received from a local control panel via a local interconnection;
a device trip source determination module configured to determine a device trip source based on at least one of: the remote device trip initiation input and the local device trip initiation input; and
a device reset determination module configured to:
automatically generate a device reset when the device trip source determination module determines that the device trip source is a remote device trip based on the remote trip condition input; and
generate a device reset, when the device trip source determination module determines that the device trip source is a local device trip based on the local device reset input.

2. The process control device of claim 1, wherein the controller further includes a system start up sequence input, and wherein a timed synchronized startup is performed based on the device reset and the system start up sequence input.

3. The process control device of claim 1, wherein the controller further includes a source of trip indication output, and wherein the controller generates an indication of the source of the device trip initiator based on at least one of: the remote device trip initiation input and the local device trip initiation input.

4. The process control device of claim 1, wherein the controller is configured to record when a reset is performed.

5. The process control device of claim 1, wherein the controller is selected from a group of: a local control panel, a logic solver, and a digital valve controller, and wherein the device trip source determination module and the device reset determination module are incorporated into the controller.

6. The process control device of claim 1, wherein the controller is a local control panel, and wherein the local control panel receives the local device trip initiation input and the local device reset input from a local push button panel.

7. A system for resetting a process control device in a process plant, the system comprising:
a process control device; and
a controller having a remote device trip initiation input, a local device trip initiation input, a remote trip condition input, and a local device reset input, wherein the local device trip initiation input and the local device reset input are received from a local control panel via a local interconnection, and wherein the controller is configured to determine a device trip source based on at least one of: the remote device trip initiation input and the local device trip initiation input, and wherein the controller is further configured to:
automatically generate a device reset, when the device trip source determination module determines that the device trip source is a remote device trip, based on the remote trip condition input; and
generate a device reset, when the device trip source determination module determines that the device trip source is a local device trip, based on the local device reset input.

8. The system of claim 7, wherein the controller further includes a system start up sequence input, and wherein a timed synchronized startup is performed based on the device reset and the system start up sequence input.

9. The system of claim 7, wherein the controller further includes a source of trip indication output, and wherein the controller generates an indication of the source of the device trip initiator based on at least one of: the remote device trip initiation input and the local device trip initiation input.

10. The system of claim 7, wherein the controller is configured to record when a reset is performed.

11. The system of claim 7, wherein the controller is selected from a group of: a local control panel, a logic solver, and a digital valve controller.

12. The system of claim 7, wherein the controller is a local control panel, and wherein the local control panel receives the local device trip initiation input and the local device reset input from a local push button panel.

13. A computer implemented method of resetting a process control device within a process plant, the method comprising:

receiving a remote device trip initiation input at a processor of a computing device in response to the processor executing a remote device trip initiation input receiving module;

receiving, from a local control panel via a local interconnection, a local device trip initiation input at a processor of a computing device in response to the processor executing a local device trip initiation input receiving module;

receiving a remote trip condition input at a processor of a computing device in response to the processor executing a remote trip condition input receiving module;

receiving, from a local control panel via a local interconnection, a local device reset input at a processor of a computing device in response to the processor executing a local device reset input receiving module;

determining, using a processor of a computing device, a device trip source based on at least one of: the remote device trip initiation input and the local device trip initiation input, in response to the processor executing a device trip source determination module; and automatically generating, using a processor of a computing device, a device reset, when the device trip source is determined to be a remote device trip, based on the remote trip condition input, in response to the processor executing a device reset determination module; and generating, using a processor of a computing device, a device reset, when the device trip source is determined to be a local device trip, based on the local device reset input, in response to the processor executing the device reset determination module.

14. The method of claim 13, further comprising:
receiving a system start up sequence input at a processor of a computing device; and
performing a timed synchronized startup based on the device reset and the system start up sequence input.

15. The method of claim 13, further comprising:
generating, using a processor of a computing device, a source of trip indication output based on at least one of: the remote device trip initiation input and the local device trip initiation input, in response to the processor executing a device trip source determination module.

16. The method of claim 13, further comprising:
recording, using a processor of a computing device, when a reset is performed in response to the processor executing a device state receiving module.

17. The method of claim 13, further comprising:
receiving, at a processor of a computing device, a device status input; and
generating, using a processor of a computing device, a device status based on the device status input, in response to the processor executing a device status determination module.

18. The method of claim 13, wherein the controller is a local control panel, and wherein the local control panel receives the local device trip initiation input and the local device reset input from a local push button panel.

19. The method of claim 13, further comprising:
transmitting, using a processor of a computing device, a device trip state to a process control device in response to the processor executing a device trip state transmission module.

20. The method of claim 13, further comprising:
transmitting, using a processor of a computing device, a device normal state to a process control device in response to the processor executing a device normal state transmission module.

* * * * *

UNITED STATES PATENT AND TRADEMARK OFFICE
CERTIFICATE OF CORRECTION

PATENT NO. : 10,295,977 B2  
APPLICATION NO. : 15/005087  
DATED : May 21, 2019  
INVENTOR(S) : Stanley Felix Amirthasamy et al.

Page 1 of 1

It is certified that error appears in the above-identified patent and that said Letters Patent is hereby corrected as shown below:

In the Claims

At Column 9, Line 64, "device reset" should be -- device reset, --.

Signed and Sealed this  
Eleventh Day of February, 2020

Andrei Iancu  
*Director of the United States Patent and Trademark Office*